(12) United States Patent
Vyas et al.

(10) Patent No.: US 11,929,845 B2
(45) Date of Patent: Mar. 12, 2024

(54) AI-BASED VIRTUAL PROXY NODES FOR INTENT RESOLUTION IN SMART AUDIO DEVICES

(71) Applicant: INTERNATIONAL BUSINESS MACHINES CORPORATION, Armonk, NY (US)

(72) Inventors: Anvita Vyas, Deori (IN); Namit Kabra, Hyderabad (IN); Vijay Ekambaram, Chennai (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 17/570,592

(22) Filed: Jan. 7, 2022

(65) Prior Publication Data
US 2023/0224186 A1    Jul. 13, 2023

(51) Int. Cl.
*H04L 12/28* (2006.01)

(52) U.S. Cl.
CPC .......... *H04L 12/283* (2013.01); *H04L 12/282* (2013.01); *H04L 12/2827* (2013.01); *H04L 12/2838* (2013.01); *H04L 2012/2849* (2013.01)

(58) Field of Classification Search
CPC . H04L 12/282; H04L 12/2827; H04L 12/283; H04L 12/2838; H04L 2012/2849
See application file for complete search history.

(56) References Cited

U.S. PATENT DOCUMENTS

| 9,633,674 B2 | 4/2017 | Sinha |
| 10,325,596 B1* | 6/2019 | Tran .................... G10L 15/1822 |
| 10,496,905 B2 | 12/2019 | Solomon et al. |
| 10,854,206 B1* | 12/2020 | Liu .......................... G10L 15/22 |
| 11,031,008 B2* | 6/2021 | Kim ....................... G10L 15/22 |

(Continued)

FOREIGN PATENT DOCUMENTS

CN        107968828        4/2018

OTHER PUBLICATIONS

Mell et al., "The NIST Definition of Cloud Computing", NIST, Special Publication 800-145, Sep. 2011, 7 pages.

(Continued)

*Primary Examiner* — Stephen J Clawson
(74) *Attorney, Agent, or Firm* — Gavin Giraud; Andrew D. Wright; Calderon Safran & Cole, P.C

(57) ABSTRACT

A system and method are disclosed that utilizes an artificial intelligence based virtual proxy node. The virtual proxy node includes an intent resolution model and communicates between a smart audio device and at least one secondary device, wherein the at least one secondary device is configured to be controlled by a smart audio device or smart hub. The virtual proxy node tracks interactions between the smart audio device and the at least one secondary device to derive historical and context data from the tracking interactions. The virtual proxy node uses the historical and context data to predict which secondary device will be successful in responding to the user input command and broadcasts the input command to the virtual proxy node associated with one of the at least one secondary device. The virtual proxy node includes an intent resolution model trained by historical and context data.

20 Claims, 10 Drawing Sheets

(56) References Cited

U.S. PATENT DOCUMENTS

| | | | |
|---|---|---|---|
| 2014/0365226 A1 | 12/2014 | Sinha | |
| 2017/0160813 A1* | 6/2017 | Divakaran | G06N 3/006 |
| 2018/0025287 A1* | 1/2018 | Mathew | G06N 5/04 |
| | | | 706/12 |
| 2018/0131904 A1* | 5/2018 | Segal | G11B 27/031 |
| 2018/0150749 A1* | 5/2018 | Wu | G06N 5/02 |
| 2018/0197439 A1* | 7/2018 | Gordon | G09B 19/04 |
| 2018/0336009 A1* | 11/2018 | Yoganandan | G06F 3/0346 |
| 2019/0005955 A1* | 1/2019 | Bhattacharya | G10L 15/08 |
| 2019/0311720 A1* | 10/2019 | Pasko | G10L 15/32 |
| 2020/0162354 A1* | 5/2020 | Drees | G06N 3/045 |
| 2020/0241829 A1 | 7/2020 | Long | |
| 2020/0294490 A1 | 9/2020 | Wang et al. | |
| 2021/0280325 A1* | 9/2021 | Jepperson | G06F 40/10 |
| 2021/0383796 A1* | 12/2021 | Coucke | G10L 15/22 |
| 2023/0035128 A1* | 2/2023 | Barscevicius | G10L 15/22 |
| 2023/0215430 A1* | 7/2023 | Rakshit | G10L 15/22 |
| | | | 704/270 |

OTHER PUBLICATIONS

Qlan Chen et al., "BERT for Joint Intent Classification and Slot Filling", https://arxiv.org/pdf/1902.10909.pdf, Feb. 28, 2019, 6 pages.

* cited by examiner

AI-BASED VIRTUAL PROXY NODES FOR INTENT RESOLUTION IN SMART AUDIO DEVICES

BACKGROUND

Aspects of the present invention relate generally to virtual proxy nodes in smart audio devices, and, more particularly, to using artificial intelligence based (AI-based) methods with the virtual proxy nodes to improve intent resolution in the disambiguation and broadcast of user commands and instructions to devices.

Smart audio devices are very commonly used to control various other objects in the smart home. Smart audio devices, sometimes known as smart speakers, receive commands from the user, typically spoken commands, and tunnel the commands to appropriate network devices as command signals to interact with them. Intent identification, or intent resolution, is one of the major elements in smart audio devices where the system identifies the target device to which the audio command should be re-directed. When intent identification is not successful, the smart audio device broadcasts the signal to all nearby devices to see which device can pick it up successfully.

SUMMARY

In a first aspect of the invention, there is a computer-implemented method for dynamically enhancing execution of smart audio device using virtual proxy nodes to control smart home appliances. In embodiments, the method includes: performing intent resolution for a user input command, by an artificial intelligence based task identifier and intent resolution module of a smart audio device, the smart audio device communicatively coupled to at least one secondary device via a plurality of virtual proxy nodes on the smart audio device, each of the at least one secondary device having a corresponding virtual proxy node of the plurality of virtual proxy nodes, wherein the at least one secondary device is configured to be controlled by a smart audio device or smart hub; tracking interactions between the smart audio device and the at least one secondary device; deriving historical and context data from the tracking interactions; predicting whether the corresponding virtual proxy node will produce a successful output in response to the user input command of the smart audio device; and broadcasting, by the corresponding virtual proxy node of the smart audio device, the user input command to the corresponding secondary device.

In another aspect of the invention, there is a computer program product including one or more computer readable storage media having program instructions collectively stored on the one or more computer readable storage media. The program instructions are executable to: responsive to a user input command to a smart audio device, send the user input command and corresponding context information to an artificial intelligence based task identifier and intent resolution module communicatively coupled to the smart audio device, the smart audio device communicatively coupled to at least one secondary device via a plurality of virtual proxy nodes of the smart audio device, each of the at least one secondary device having a corresponding virtual proxy node of the plurality of virtual proxy nodes, wherein the at least one secondary device is configured to be controlled by a smart audio device or smart hub; track interactions between the smart audio device and the at least one secondary device; derive historical and context data from the tracking interactions; send the tracked interactions and historical and context data to the task identifier and intent resolution module; receive a prediction of whether the corresponding virtual proxy node will produce a successful output in response to the user input command of the smart audio device, from the task identifier and intent resolution module; and broadcast, by the corresponding virtual proxy node of the smart audio device, the user input command to the corresponding secondary device.

In another aspect of the invention, there is a system including a processor, a computer readable memory, one or more computer readable storage media, and program instructions collectively stored on the one or more computer readable storage media. The program instructions are executable to: receive, by an artificial intelligence based task identifier and intent resolution module communicatively coupled to a smart audio device, a user input command to the smart audio device and associated context; perform intent resolution for the user input command, by the artificial intelligence based task identifier and intent resolution module using a trained intent resolution model, wherein the smart audio device is communicatively coupled to at least one secondary device via a plurality of virtual proxy nodes, each of the at least one secondary device having a corresponding virtual proxy node of the plurality of virtual proxy nodes, wherein the at least one secondary device is configured to be controlled by a smart audio device or smart hub; receive, from the smart audio device, tracking interactions between the smart audio device and the at least one secondary device; derive historical and context data from the tracking interactions; predict whether the corresponding virtual proxy node will produce a successful output in response to the user input command of the smart audio device; and send a prediction of successful output to the smart audio device.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
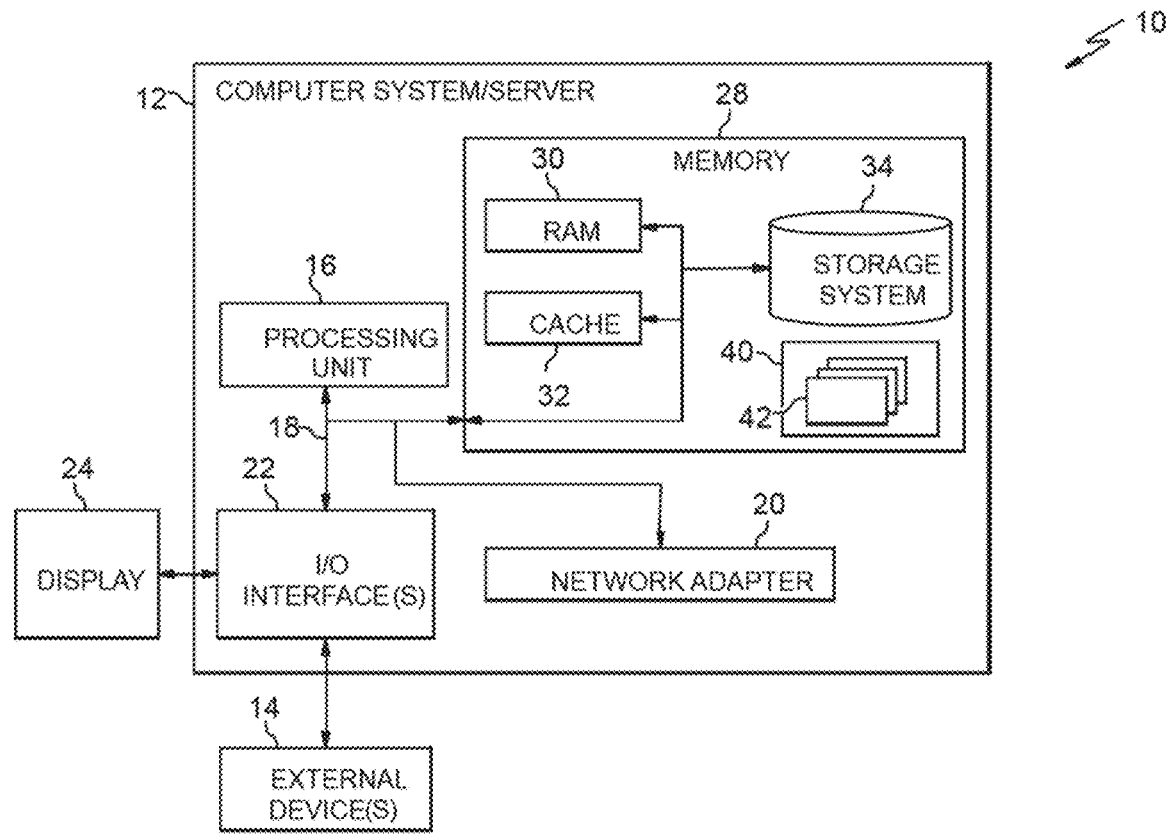
FIG. 1 depicts a cloud computing node according to an embodiment of the present invention.

Aspects of the present invention relate generally to virtual proxy nodes in smart audio devices, and more particularly, to using artificial intelligence based (AI-based) methods with the virtual proxy nodes to improve intent resolution in the disambiguation and broadcast of user commands and instructions to devices.

Existing systems may broadcast user commands as signals to all devices in the user's network when the smart audio device cannot disambiguate the intent of the user. Broadcasting to all possible secondary devices has various disadvantages. For instance, secondary devices may experience a loss of power while processing irrelevant signals. There may be security threats involved in broadcasting. And the extra time to generate signals for all possible devices may result in increased latency. In existing systems, since all the devices hear the commands, they can also collect all the user information, which is a problem from privacy standpoint.

Embodiments as described herein avoid these issues by utilizing artificial intelligence based (AI-based) machine learning/processing to help disambiguate the user's commands to a smart audio device. The smart audio devices will use a virtual proxy for each of its interacting secondary devices. In an embodiment, the virtual proxy resides inside the smart audio device to facilitate the smart audio device in performing quick decisions to resolve intent ambiguities. In embodiments, the smart audio device utilizes AI-based virtual proxy nodes between a smart audio device, i.e., an Amazon Echo® smart speaker, Google Nest® or Google Home® audio devices available from Google LLC, or other smart speaker device, and secondary devices (i.e., sound systems, smart televisions, lights, and other edge or Internet of Things (IoT) devices controlled by smart speakers or smart hubs). In embodiments, the machine learning element may be performed by a remote server (i.e., the Cloud), or locally on the smart audio device, based on processing power of the smart audio device. Transaction information corresponding to secondary devices may be stored locally on the smart audio device for each secondary device that can be controlled by the smart audio device. Transaction information may include tracking information corresponding to whether a particular secondary device was able to successfully execute the user's command to the smart audio device. The machine learning model for the virtual proxy node uses the transaction information as training input to fine-tune the model.

In an embodiment, a virtual proxy node operates between smart audio devices and secondary devices (i.e., devices controlled by smart audio devices), wherein the virtual proxy node tracks interactions between the smart audio device and secondary device. The virtual proxy node uses the interaction data (e.g., historical information identified during the tracking of interactions) to train the AI-based intent resolution models to predict binary classification outputs for all the standard high-level application programming interfaces (APIs) of the secondary device. For all the APIs of the secondary device, the virtual proxy node predicts whether the given input command can produce a successful response or not. It should be noted that embodiments may not predict the response, but only predict whether a proper response can be achieved or not.

In an embodiment, the system also synchronizes state changes of the secondary devices with the virtual proxy nodes, thereby maintaining a temporary proxy state for each active secondary device. In scenarios where multiple devices can respond to a user's intent, this state information acts as primary signal for disambiguation.

In an embodiment, there is a computer implemented method, to perform: utilizing artificial intelligence based virtual proxy nodes between a smart audio device, and secondary devices controlled by smart speakers or smart hubs; tracking interactions between the smart audio device and secondary devices for predicting outputs; predicting whether the virtual proxy node will produce a successful output in response to a given input command of the smart audio device; and broadcasting by the smart audio device, the input command to the virtual proxy nodes to make a better decision.

Implementations of various embodiments may provide an improvement in the technical field of smart audio speaker command forwarding. In particular, implementations use machine learning to train an AI-based virtual proxy node module to automatically disambiguate a user's spoken commands using natural language processing (NLP) and natural language understanding (NLU) and context-based information to identify a probable secondary device to which the command should be broadcast, thereby reducing wasted broadcast messages to irrelevant network devices while also improving security of the system and reducing latency and unnecessary power losses. Implementations may transform an article to a different state or thing. In particular, implementations may cause a secondary device to perform a requested action and update stored context and state information related to the machine learning functions. Speech patterns of the user are monitored by an intent identification/resolution module to identify a requested task associated with other context surrounding the user, such as location, temporal information, historical requests, etc. Historical information is updated dynamically and stored as user requests are identified and broadcast to appropriate secondary devices.

It should be understood that, to the extent implementations of the invention collect, store, or employ personal information provided by, or obtained from, individuals (for example, user location and requests), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 2:
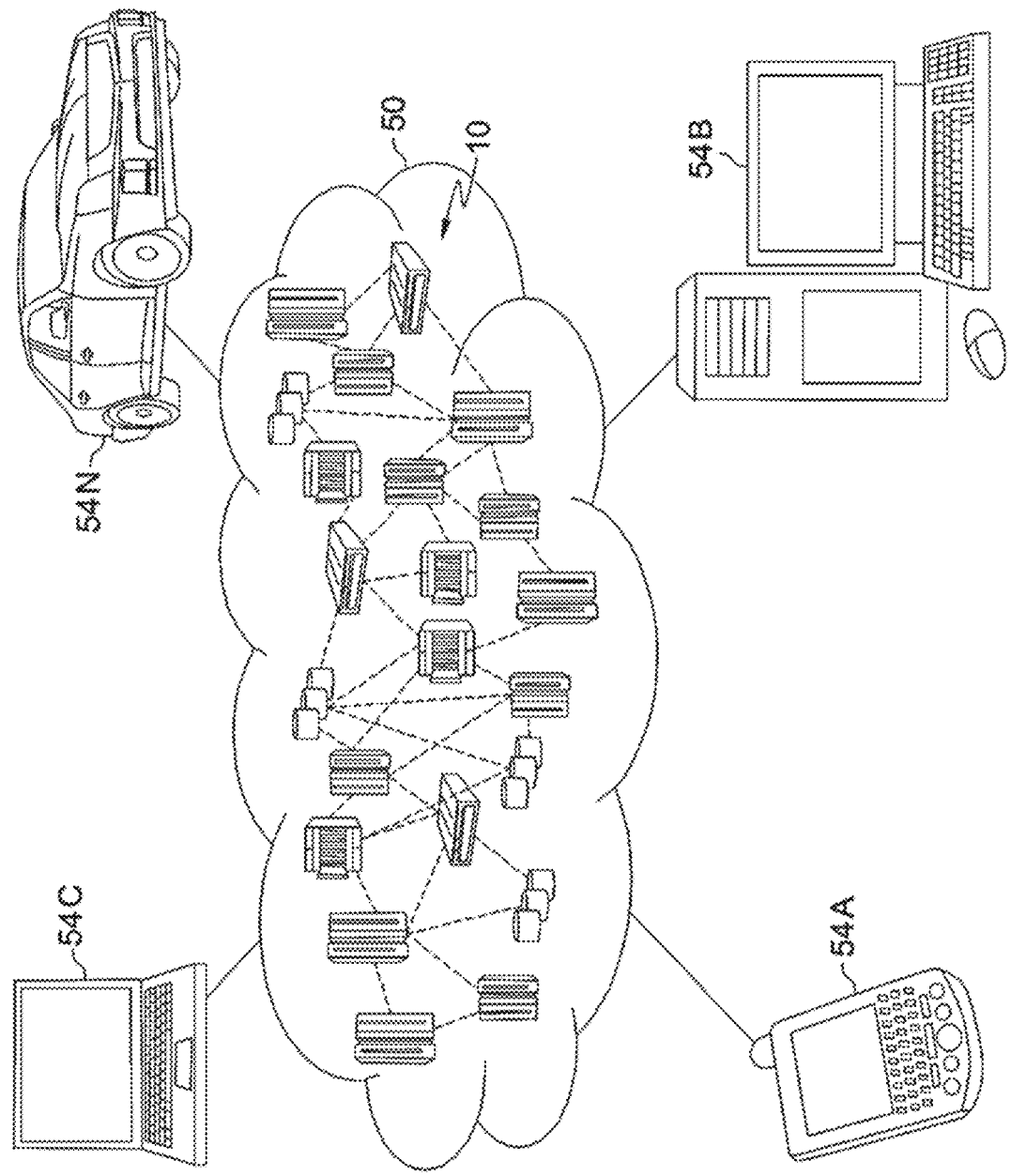
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
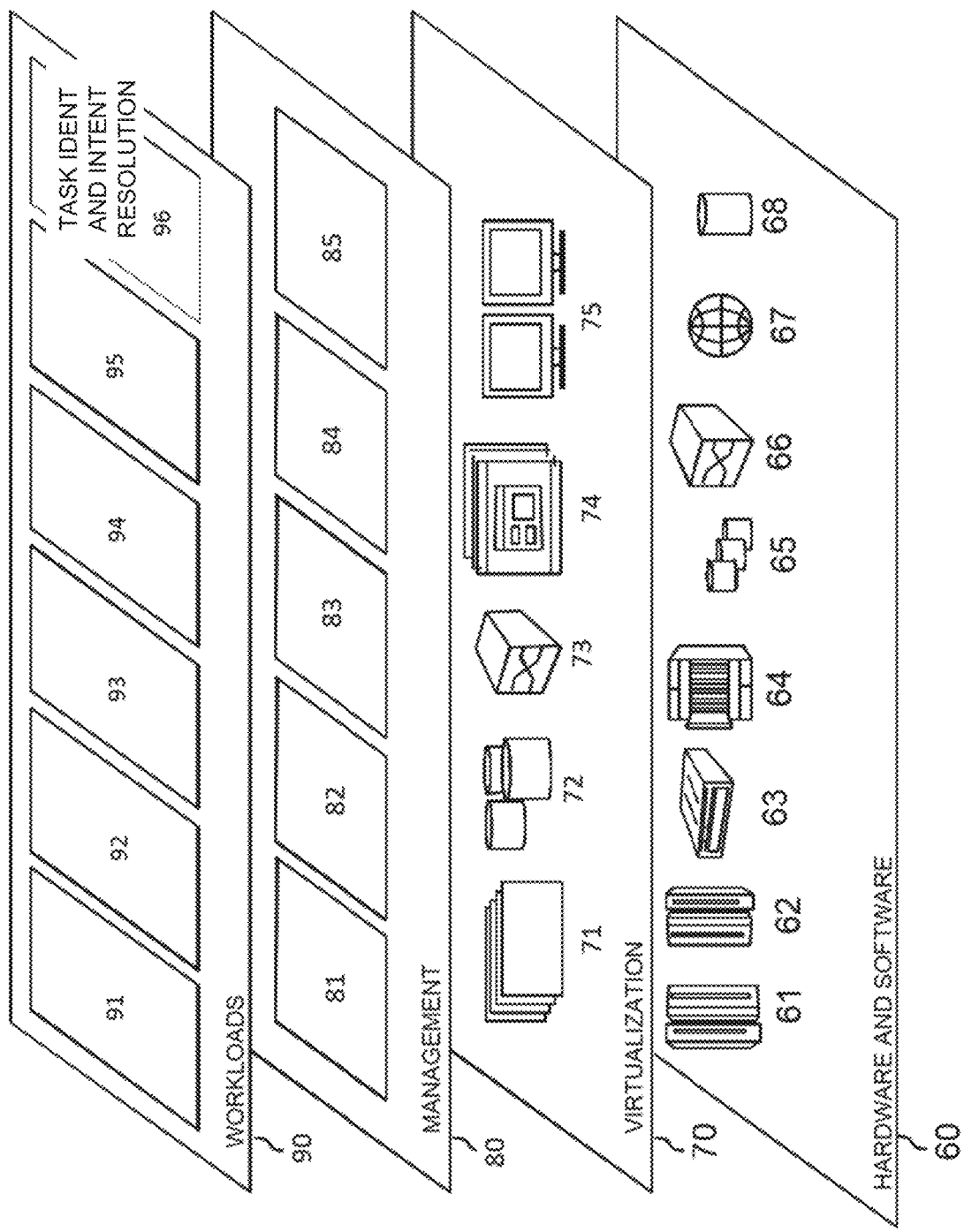
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload's layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and task identification and intent resolution 96.

Implementations of the invention may include a computer system/server 12 of FIG. 1 in which one or more of the program modules 42 are configured to perform (or cause the computer system/server 12 to perform) one of more functions of the task identification and intent resolution function 96 of FIG. 3. For example, the one or more of the program modules 42 may be configured to: track interactions between a user and a smart audio device; identify a task requested by the user; identify at least one probable secondary device for the task using historical context, trained intent resolution models; and forward the task requested by the user to the at least one probable secondary device. Implementations may further train the intent resolution model based on user feedback and/or historical context.

Figure 4:
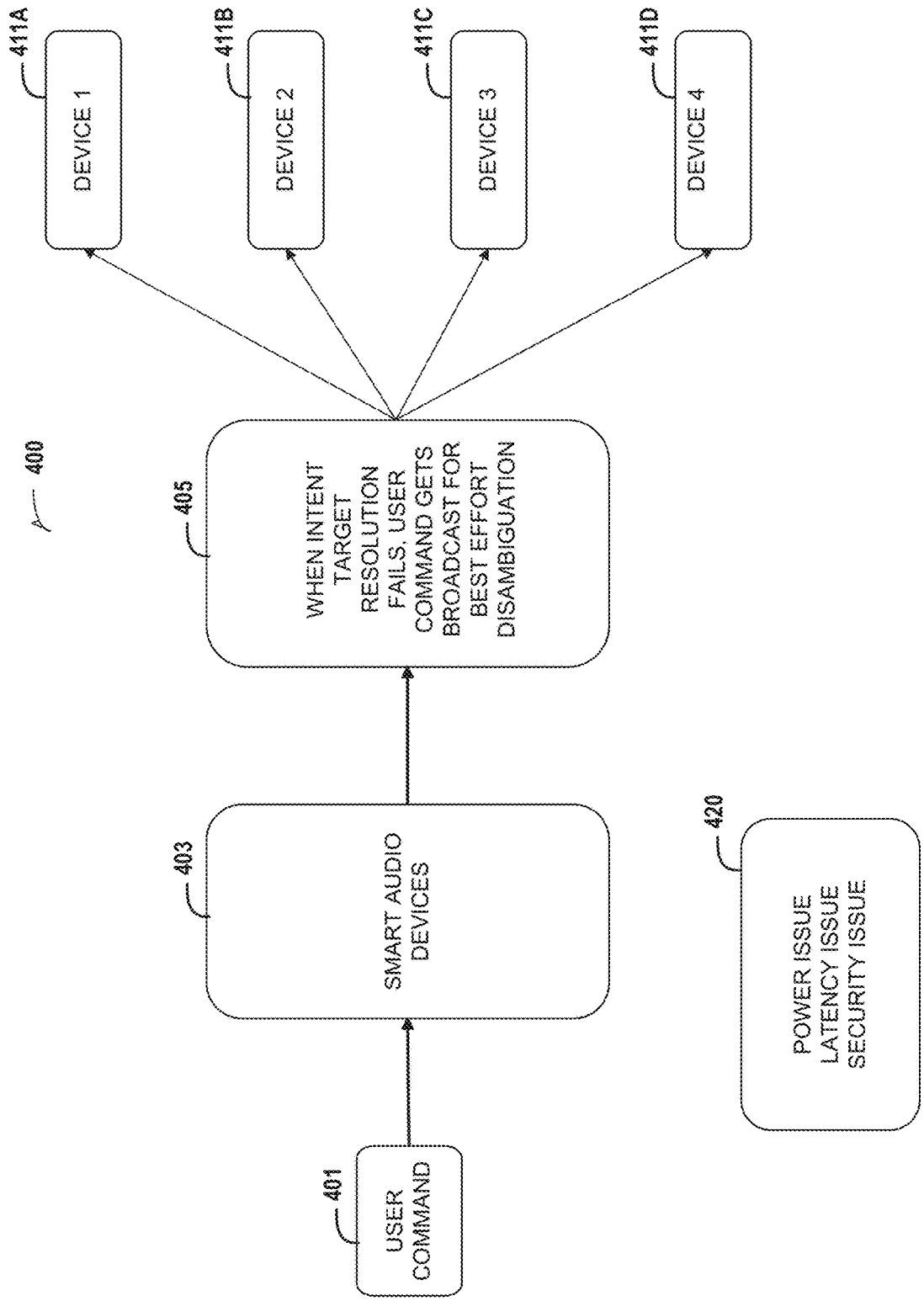
FIG. 4 shows a block diagram of an environment for broadcasting user commands to devices using a smart audio speaker.

FIG. 4 shows a block diagram of an environment 400 for broadcasting user commands 401 to devices 411A-D using a smart audio device 403. It will be understood that the term "smart speaker" may be used synonymously with the term "smart audio device" in the present disclosure. In existing systems, a user speaks to a smart audio device 403 to provide a command 401 for operating a secondary device 411A-D in the user's network. The smart audio device 403 may not fully understand which secondary device 411A-D is intended by the user, e.g., intent resolution fails 405. In this case, the smart audio device 403 may broadcast to multiple of the secondary devices 411A-D in the network hoping that one will be the intended device and be able to perform the user's command. This may result in power, latency, and security issues 420.

Figure 5:
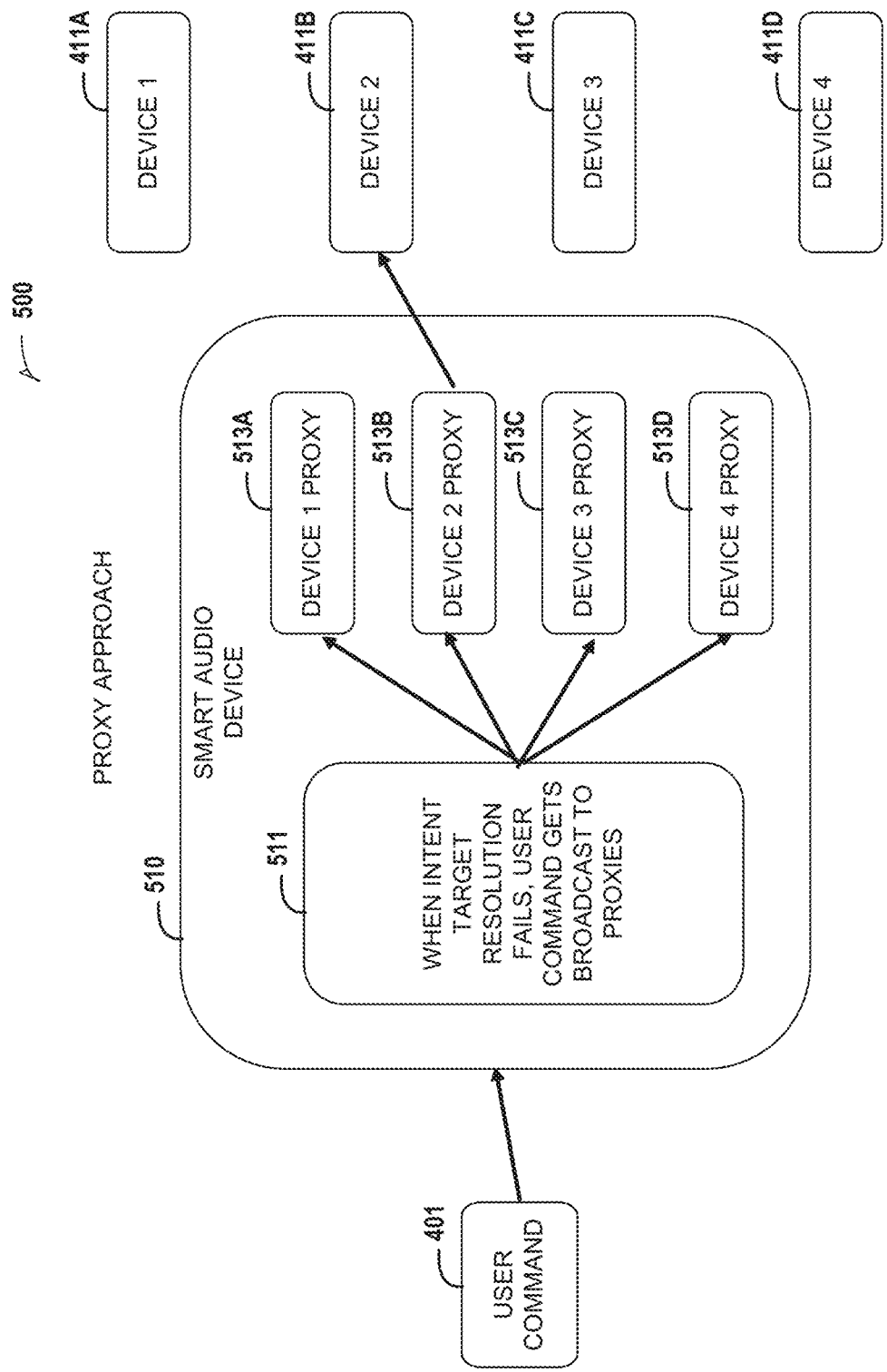
FIG. 5 shows a block diagram of an exemplary environment for using a smart speaker device with artificial intelligence based virtual proxy nodes to broadcasting user commands to devices using a smart audio speaker, according to an embodiment of the invention.

FIG. 5 shows a block diagram of an exemplary environment 500 for using a smart audio device 510 with artificial intelligence based virtual proxy nodes 513A-D to broadcast user commands 401 to devices 411A-D using a smart audio device 510, according to an embodiment of the invention. In an embodiment, a device proxy, also referred to herein as virtual proxy node, 513A-D includes a virtual AI engine which track all the interactions between the smart audio device 510 and the intended secondary device 411A-D. In other embodiments, some or all of the functions performed by device proxy 513A-D may be performed on a remote server communicatively coupled to the smart audio device 510, such as computer system/server 12 of FIG. 1. Based on the tracked interactions, the device proxy 513A-D causes a classification model to be trained, either locally or on a remote server, which can predict various high level interface outputs of the secondary device 411A-D. For example, the device proxy 513A-D may predict whether a device 411A-D can successfully respond to a command 401 or not. The device proxy 513A-D may not always be able to provide a correct response but offers high-level success/failure signals 511. The device proxy 513A-D also tracks various reachable states of the secondary device 411A-D, i.e., device context, and saves power accordingly. In scenarios where multiple devices can respond to the same user command, this state information helps identify user intent and can act as primary signal for disambiguation 511. For example, when the user commands to "reduce volume," the intent is applicable to both a television and an MP3 player in the network. Based on the state of the system (i.e., on/off, or volume status, location relative to the user), the device proxy can filter the right device more effectively.

Figure 6:
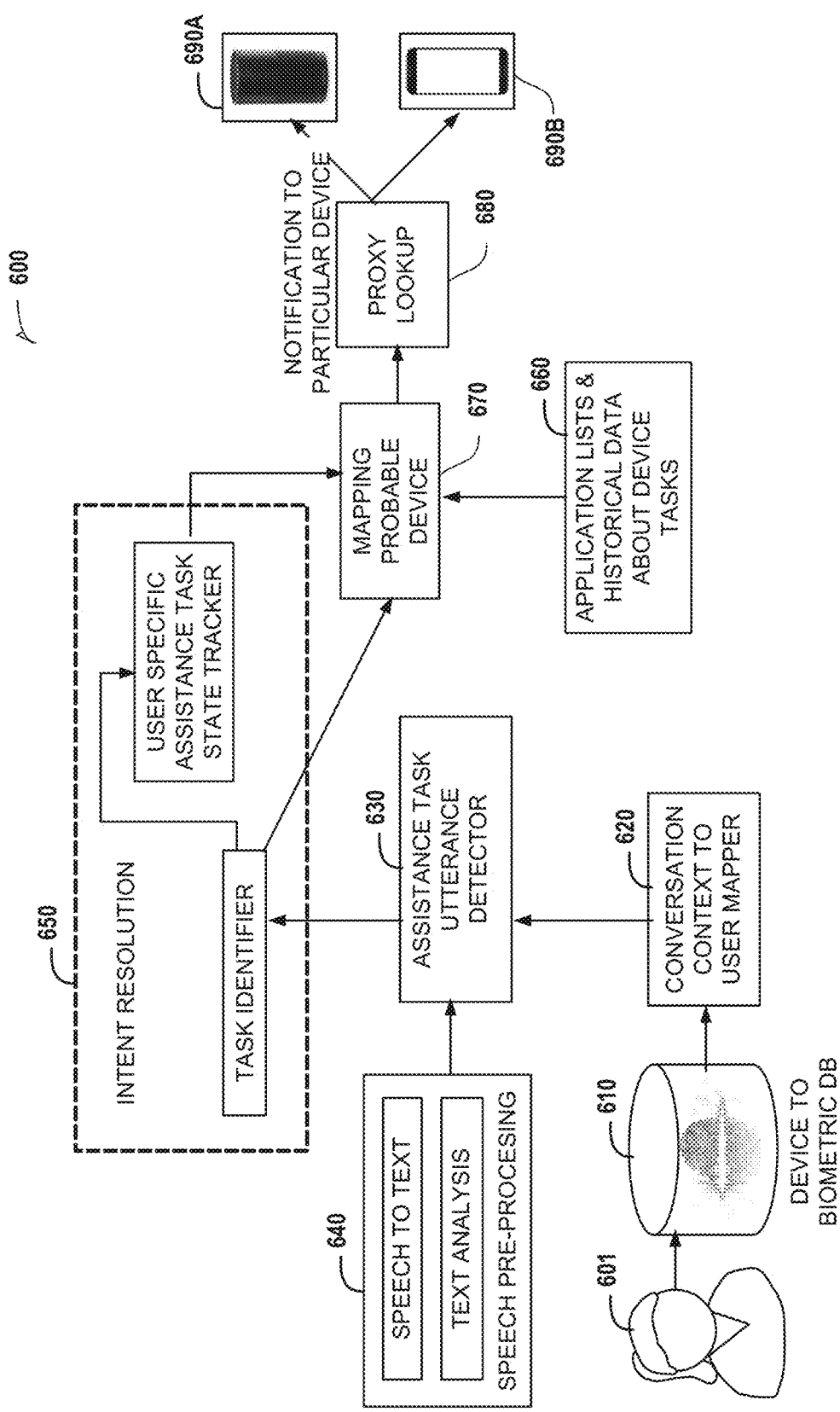
FIG. 6 shows a block diagram of an exemplary system architecture, according to an embodiment of the invention.

FIG. 6 shows a block diagram of an exemplary system architecture 600, according to an embodiment of the invention. In an embodiment a user 601 speaks and directs a command to a smart audio device 510 (FIG. 5). The smart audio device uses a biometric database 610 to identify the user 601. Conversation context is collected and mapped to the user 620. For example, the location of the user 601 may be determined based on which smart audio device can hear the user's voice. Other context may include temporal information, i.e., time of day; secondary devices 690A-B status, i.e., on, off, active, etc.; and historical interactions 660. An assistance task utterance detector 630 uses the user and context information, as well as NLP and NLU of the speech text to identify the type of command. The speech may be pre-processed using speech to text and text analysis models 640.

Once a task is identified, an intent resolution model 650 predicts probable devices in the user's network that might be successful in processing the command. The intent resolution model 650 is an AI-based trained model that uses the interaction tracking, device state tracking, and user context information to predict probable secondary devices 690A-B. In an embodiment, one probable device is predicted. In another embodiment, multiple probable secondary devices are predicted and selected in a priority order.

In an embodiment, metadata and information related to the secondary devices is stored locally on the smart audio device 510 (FIG. 5) in memory store 660. In an embodiment, the virtual proxy nodes 513A-D and AI-based models may operate on one or more remote servers, such as computer system/server 12 (FIG. 1), communicatively coupled to the smart audio speaker. In existing systems, NLP and NLU of the user commands are typically performed on a remote server. The smart audio device 510 continuously monitors audio input in search of the wake word for the device. Once the wake word is identified, further speech is recorded and sent to the remote server for processing. It will be understood that as smart audio devices, i.e., smart speakers, evolve to include more memory, storage and processing power, various functions of the virtual proxy node and intent resolution model 650 can be performed locally, either partially or completely, on the smart audio device 510.

To help identify a probable secondary device 690A-B capable of responding to the user command, a probable list of skills, capabilities and functionalities of each secondary device is retrieved and indexed from the instruction manuals and regular updates and stored with metadata on the smart audio device 510. The skills, capabilities, and functionalities of the secondary device factor into determining which secondary devices are more probable with respect to intent resolution. A list of possible tasks that can be performed may be derived and associated with each secondary device. Some tasks may be performed by more than one available secondary device. The historical data about what secondary devices were able to understand and process which requests/commands is available in the tracking data and can be used to train a multi-class classification model about which secondary device can execute which user utterances.

In an embodiment, a task identification and intent resolution module 96 (FIG. 3) communicates with the smart audio device to determine the intent resolution and probable secondary device(s). The probable secondary device prediction is forwarded to the mapping function 670. In embodiments, the determining of intent resolution and probable device may be performed locally by the smart audio device. It will be understood that various functions of the task identification and intent resolution module may be distributed between one or more computer system/servers 12 and smart audio device 510, in implementations. The virtual proxy node performs a proxy lookup 680 and sends notification, e.g., the user command/request, to the secondary device 690A-B. If the predicted device cannot perform the requested action, the virtual proxy node may then send the request to the next secondary device on the priority list.

In an embodiment. if the secondary device begins performing the request, but the user determines that the wrong device has responded, the user may immediately cancel the request and/or provide other feedback. This interaction is tracked and used as training input to the intent resolution model 650. Thus, the next time the user makes such a request, the undesired secondary device may be bumped to a lower priority for predicted secondary devices.

Figure 7:
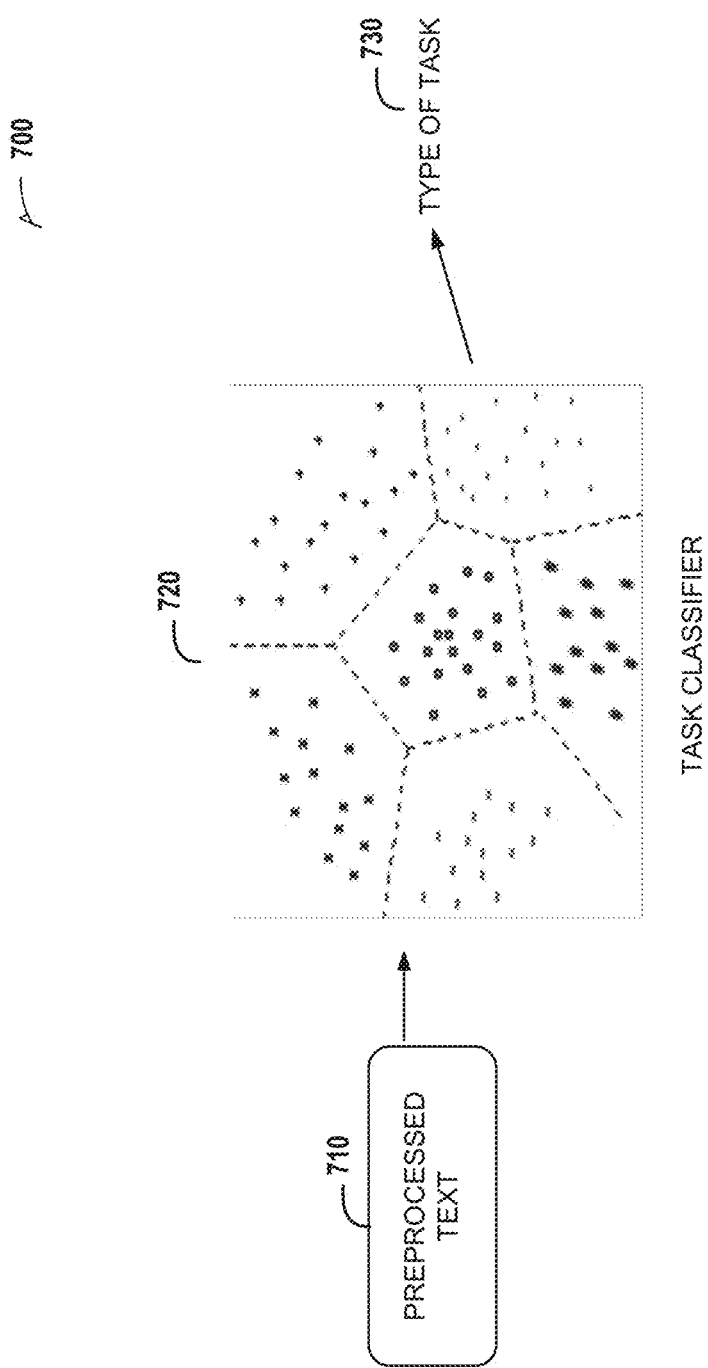
FIG. 7 shows a block diagram of an exemplary assistance task utterance detector, according to an embodiment of the invention.

In an embodiment, the intent resolution module 650 identifies and classifies the user command or request and as further discussed corresponding to the task utterance detector of FIG. 7. As disclosed herein, NLP/NLU is used to derive user intent. NLU involves both intent classification and slot filling tasks to semantically understand user utterances. Intent classification predicts the intent of the text whereas, slot filling extracts concepts and information related to the intent.

In an example, a user may utter, "play me Jane Doe songs." In this case, the intent is to play songs on some sort of audio system. This command might be fulfilled by a smart television, stereo system, smart speaker, or other device that can render audio. It is possible that more than one of these devices is available on the user network. In this case, the slot is the genre: songs, and artist or vocalist Jane Doe. The NLU module will understand that Jane Doe is the singer and not a director/producer/actor, etc.

Intent classification is a multi-class classification problem to understand the intent given a list of possible intents by a user. The classes in the intent classification are defined by the list of all possible functionalities all the secondary devices in the network. Slot filling is a sequence labelling task that tags the input word sequence, i.e., user command or request.

Systems may use variations of bidirectional encoder representations from transformers (BERT) to fulfill these tasks. BERT is an open-source machine learning framework for NLP. It is designed to help computers understand the meaning of potentially ambiguous language in text by using the surrounding text to establish context. The language models are based on Transformers, a deep learning model in which every output element is connected to every input element, and the weightings between them are dynamically calculated based upon their connection. Since BERT is bidirectional it can be pre-trained on two different but related NLP tasks. Embodiments may utilize BERT or other models in NLU, as well as using metadata of the user and secondary devices to derive user intent.

FIG. 7 shows a block diagram of an exemplary assistance task utterance detector 700, according to an embodiment of the invention. In an embodiment, a pre-trained multiclass classifier acts as the task utterance detector or task classifier 720. The classifier is trained with different utterances given some history and receives pre-processed text 710 in a predetermined format. Output of the classifier is at least one predicted secondary device that may be intended for the command, and an understanding of the task is associated with the kind of assistance task requested 730. For example, a user may say, "Switch on the light." This task may be related to a smart bulb or smart outlet in the network. If a user says, "play music" the related task may be to activate a secondary device on the network such as a smart television or music system.

Figure 8:
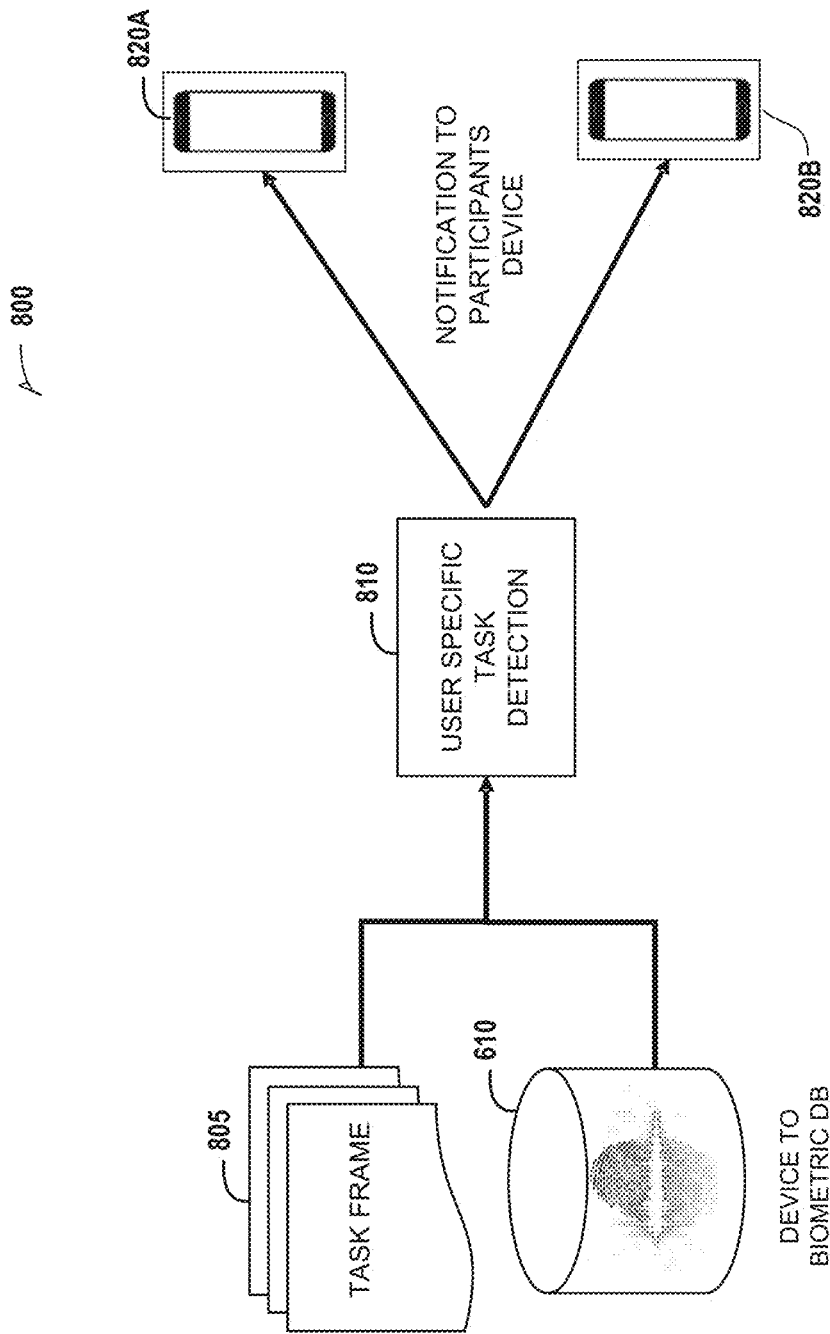
FIG. 8 shows a flow chart for an exemplary method for user specific task prompter, according to an embodiment of the invention.

FIG. 8 shows a flow chart for an exemplary method 800 for user specific task prompter, according to an embodiment of the invention. In an embodiment, once the task is distilled, a user specific task prompter 810 may be utilized to further disambiguate the request. The user specific prompter 810 may prompt the respective participant's mobile devices 820A-B about the new assistive task, or command presented by task frames 805. In this context, a task frame is a task and device classifier, based, on user preference. If the same task can be performed by multiple secondary devices 690A-B (FIG. 6) in the network, then it may be unknown which smart system should be invoked. For instance, different people might have different preferences regarding on which device music should be rendered. One user might prefer to listen on an available mono smart speaker, and another user might prefer the music to be played through a stereo smart television speaker. In an example, a first user says, "play some dance music." Speech acoustic factors are compared to user identification data stored in the biometric database 610 (FIGS. 6 and 8) to identify the speaker User1. Historical data shows that User1 has a preference toward listening on a smart music system. When a second user utters the same phrase, "play some dance music," the biometric data comparison identified the speaker as User2. Historical data shows that User2 has a preference toward listening on a smart television with video, for instance on a YouTube® channel available from Google LLC. Based on the task detected by the command and user profile, the task is then relayed to the most probable device.

In an embodiment, the user preferences may be stored as metadata at the smart audio device 510 (FIG. 5) or at a remote server location such as computer system/server 12 (FIG. 1) that is communicatively coupled to the smart audio device 510. When profile and preference information is unavailable or incomplete, the user may be prompted to prioritize which secondary device(s) should be used using user specific task detection 810. In an embodiment, the prompt may appear on the user's mobile device 820A-B as either a text display or a voice prompt. In another embodiment, the prompt may be a voice prompt emanating from the smart audio device 510. This feedback is used to further train the intent resolution model 650.

Figure 9:
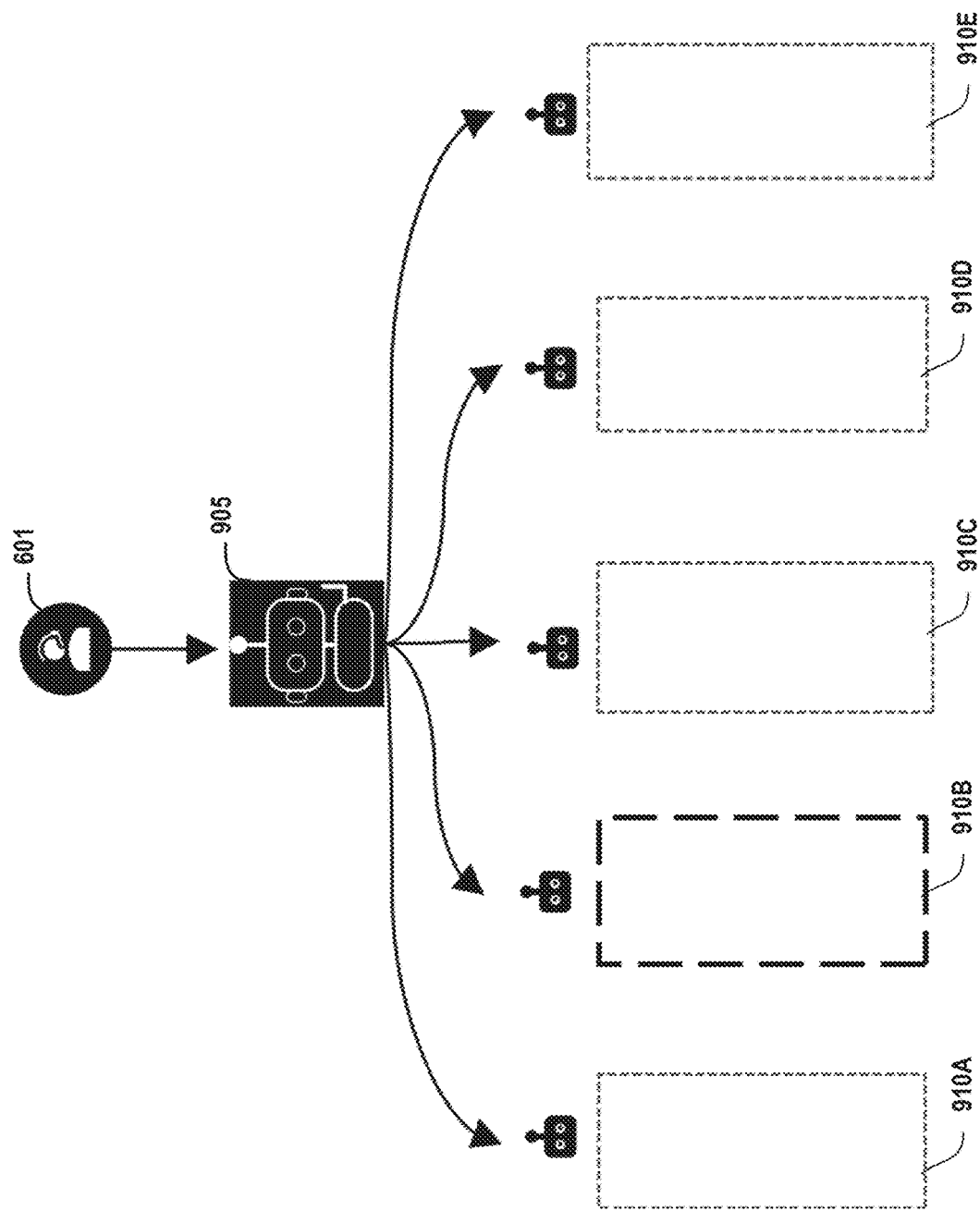
FIG. 9 shows a block diagram of an exemplary proxy lookup process, according to an embodiment of the invention.

FIG. 9 shows a block diagram of an exemplary proxy lookup process, according to an embodiment of the invention. The classifier model predicts the probability with which each secondary device 910A-E could handle the corresponding query by user 601. The proxy lookup in virtual proxy node 905 then sends the query to the secondary device 910A-E which is the most probable to execute the query. In an example, secondary device 910B is selected as the probable device. If the secondary device 910B is not able to answer the query, then the next probable device will be sent the request. In an embodiment, the model utilizes an online learning algorithm depending on if the most probable device is able to fulfill the request. In another embodiment, when the virtual proxy node 905 is not sure which device is most probable to answer the task, the virtual proxy node prompts the user for more details, for instance with user specific task detection module 810 (FIG. 8) about which device they would like to use, as described corresponding to FIG. 8. The user prompt would be to fill the missing pieces in the slots.

Figure 10:
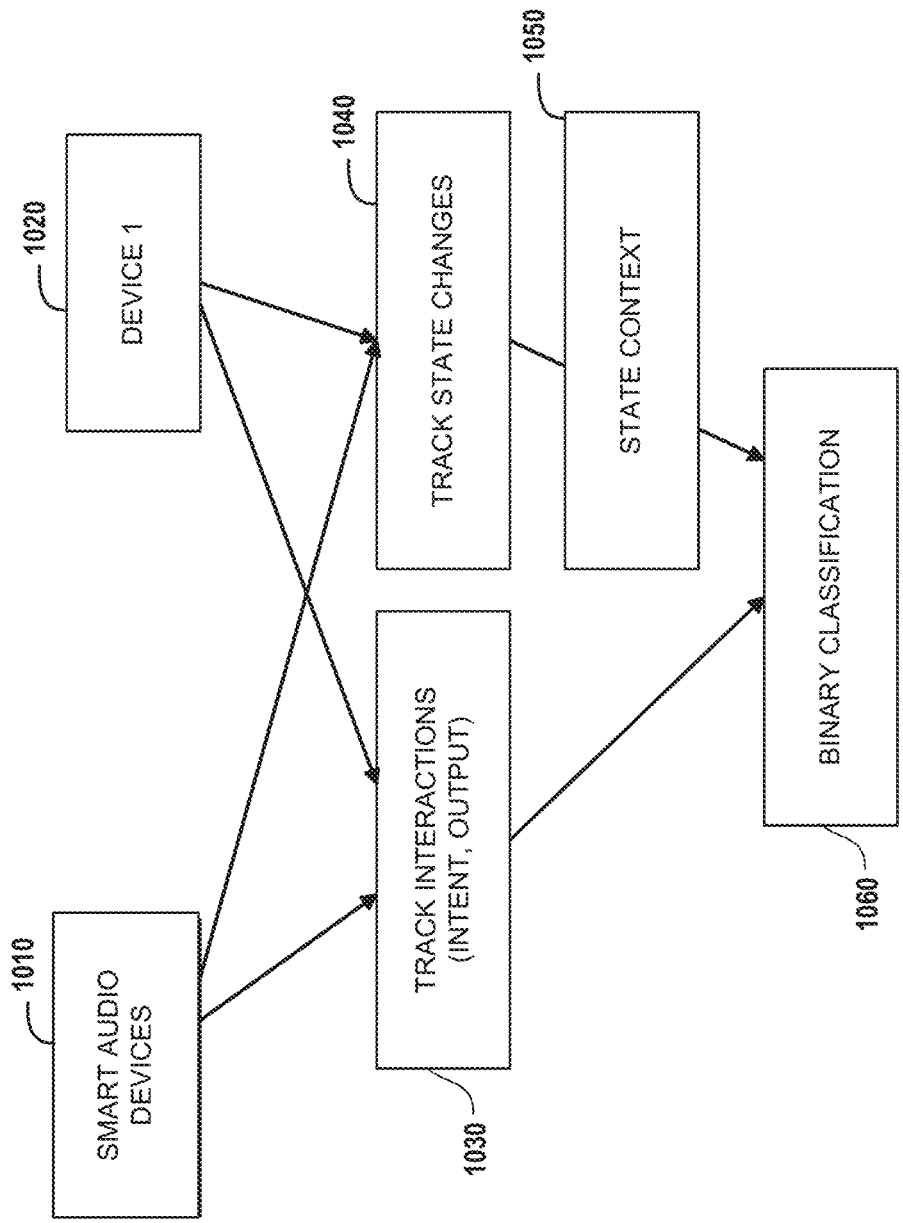
FIG. 10 shows a flow chart of an exemplary method for learning binary classification model for API interfaces, according to an embodiment of the invention.

FIG. 10 shows a flow chart of an exemplary method for learning binary classification model for API interfaces, according to an embodiment of the invention. In an embodiment, the virtual proxy node system tracks the interaction between the smart audio devices 1010 and every secondary device 1020. Each identified intent and corresponding output from the secondary device is tracked 1030. Based on the tracked information, such as tracked state changes 1040 and state contexts 1050, the virtual proxy node trains a binary classification model 1060 which predicts whether a given intent is valid or not for the secondary device. The virtual proxy node also uses device state information 1050 as additional context to enable better predictions. The virtual proxy node keeps track of every state change 1040 in the secondary device in an ad hoc fashion which is used as context for better improved binary classification.

In an embodiment, the remote server includes the NLP and NLU modules, the state, context and historical tracking modules, binary classification models, and intent resolution models, each of which may comprise one or more program modules such as program modules 42 described with respect to FIG. 1. The remote server may include additional or fewer modules than those shown in FIG. 6. In embodiments, separate modules may be integrated into a single module. Additionally, or alternatively, a single module may be implemented as multiple modules. Moreover, the quantity of devices and/or networks in the environment is not limited to what is shown in FIGS. 5 and 6. In practice, the environment may include additional devices and/or networks; fewer devices and/or networks; different devices and/or networks; or differently arranged devices and/or networks than illustrated in FIGS. 5 and 6.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprises one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
performing intent resolution for a user input command, by an artificial intelligence based task identifier and intent resolution module of a smart audio device, the smart audio device communicatively coupled to at least one secondary device via a plurality of virtual proxy nodes on the smart audio device, each of the at least one secondary device having a corresponding virtual proxy node of the plurality of virtual proxy nodes, wherein the at least one secondary device is configured to be controlled by the smart audio device or smart hub;
tracking interactions between the smart audio device and the at least one secondary device;
deriving historical and context data from the tracking interactions;
predicting whether the corresponding virtual proxy node will produce a successful output in response to the user input command of the smart audio device; and
broadcasting, by the corresponding virtual proxy node of the smart audio device, the user input command to the corresponding secondary device.

2. The computer implemented method as recited in claim 1, wherein the task identifier and intent resolution module includes an intent resolution model, and further comprising:
training the intent resolution model with the historical and context data.

3. The computer implemented method as recited in claim 2, further comprising:
responsive to an indication that the input command has not been broadcast to a desired secondary device, requesting user feedback to further disambiguate the input command; and
training the intent resolution model with the user feedback.

4. The computer implemented method as recited in claim 1, wherein the at least one secondary device comprises plural secondary devices, and further comprising:
for each one of the plural secondary devices, predicting a respective probability associated with the one of the plural secondary devices, wherein the respective probability is a probability that the one of the plural secondary devices can handle the user input command; and
ranking the plural secondary devices based on the predicted probabilities.

5. The computer implemented method as recited in claim 4, further comprising sending the user input command to a highest ranked one of the plural secondary devices.

6. The computer implemented method as recited in claim 5, further comprising:
responsive to determining the highest ranked one of the plural secondary devices cannot handle the query, sending the user input command to a next highest ranked one of the plural secondary devices.

7. The computer implemented method as recited in claim 1, further comprising:
identifying a user corresponding to the user input command using a biometric database; and
deriving intent of the user by the intent resolution model using the historical and context data and user identification, wherein the broadcasting of the user input command to the virtual proxy node associated with one of the at least one secondary device corresponds to the intent of the user.

8. A computer program product comprising one or more computer readable storage media having program instructions collectively stored on the one or more computer readable storage media, the program instructions executable to:
responsive to a user input command to a smart audio device, send the user input command and corresponding context information to an artificial intelligence based task identifier and intent resolution module communicatively coupled to the smart audio device, the smart audio device communicatively coupled to at least one secondary device via a plurality of virtual proxy nodes of the smart audio device, each of the at least one secondary device having a corresponding virtual proxy node of the plurality of virtual proxy nodes, wherein the at least one secondary device is configured to be controlled by the smart audio device or smart hub;

track interactions between the smart audio device and the at least one secondary device;

derive historical and context data from the tracking interactions;

send the tracked interactions and historical and context data to the task identifier and intent resolution module;

receive a prediction of whether the corresponding virtual proxy node will produce a successful output in response to the user input command of the smart audio device, from the task identifier and intent resolution module; and broadcast, by the corresponding virtual proxy node of the smart audio device, the user input command to the corresponding secondary device.

9. The computer program product as recited in claim 8, wherein the task identifier and intent resolution module includes an intent resolution model trained with the historical and context data.

10. The computer program product as recited in claim 9, wherein the program instructions are further executable to:
responsive to an indication that the input command has not been broadcast to a desired secondary device, request user feedback to further disambiguate the input command; and
send the user feedback to the task identifier and intent resolution module for additional training of the intent resolution model.

11. The computer program product as recited in claim 8, wherein the at least one secondary device comprises plural secondary devices, and the program instructions are further executable to:
for each one of the plural secondary devices, receive a prediction with a respective probability associated with the one of the plural secondary devices, wherein the respective probability is a probability that the one of the plural secondary devices can handle the user input command, wherein the prediction includes a ranking of the plural secondary devices based on the predicted probabilities.

12. The computer program product as recited in claim 11, wherein the program instructions are further executable to send the user input command to a highest ranked one of the plural secondary devices.

13. The computer program product as recited in claim 12, wherein the program instructions are further executable to, responsive to determining the highest ranked one of the plural secondary devices cannot handle the query, send the user input command to a next highest ranked one of the plural secondary devices.

14. A system comprising:
a processor, a computer readable memory, one or more computer readable storage media, and program instructions collectively stored on the one or more computer readable storage media, the program instructions executable to:
receive, by an artificial intelligence based task identifier and intent resolution module communicatively coupled to a smart audio device, a user input command to the smart audio device and associated context;
perform intent resolution for the user input command, by the artificial intelligence based task identifier and intent resolution module using a trained intent resolution model, wherein the smart audio device is communicatively coupled to at least one secondary device via a plurality of virtual proxy nodes, each of the at least one secondary device having a corresponding virtual proxy node of the plurality of virtual proxy nodes, wherein the at least one secondary device is configured to be controlled by the smart audio device or smart hub;
receive, from the smart audio device, tracking interactions between the smart audio device and the at least one secondary device;
derive historical and context data from the tracking interactions;
predict whether the corresponding virtual proxy node will produce a successful output in response to the user input command of the smart audio device; and
send a prediction of successful output to the smart audio device.

15. The system as recited in claim 14, wherein the program instructions are further executable to:
train the intent resolution model with the historical and context data.

16. The system as recited in claim 15, wherein the program instructions are further executable to:
receive user feedback to further disambiguate the input command; and
train the intent resolution model with the user feedback.

17. The system as recited in claim 16, wherein the program instructions are further executable to:
update the prediction of whether the corresponding virtual proxy node will produce a successful output in response to the user input command of the smart audio device based on the user feedback; and
send the updated prediction to the smart audio device.

18. The system as recited in claim 14, wherein the at least one secondary device comprises plural secondary devices, and the program instructions are further executable to:
for each one of the plural secondary devices, predict a respective probability associated with the one of the plural secondary devices, wherein the respective probability is a probability that the one of the plural secondary devices can handle the user input command;
rank the plural secondary devices based on the predicted probabilities; and
send the respective probabilities to the smart audio device with a ranking of the plural secondary devices based on probability of success.

19. The system as recited in claim 14, wherein the smart audio device is a smart speaker communicatively coupled to a remote server including the task identifier and intent resolution module.

20. The system as recited in claim 14, further comprising program instructions executable to:
receive biometric data of a user corresponding to the user input command;
identify the user corresponding to the user input command using a biometric database; and
derive intent of the user by the intent resolution model using the historical and context data and user identification; and
send the prediction of successful output to the smart audio device based in part on the derived intent of the user.

* * * * *